Figure 3:
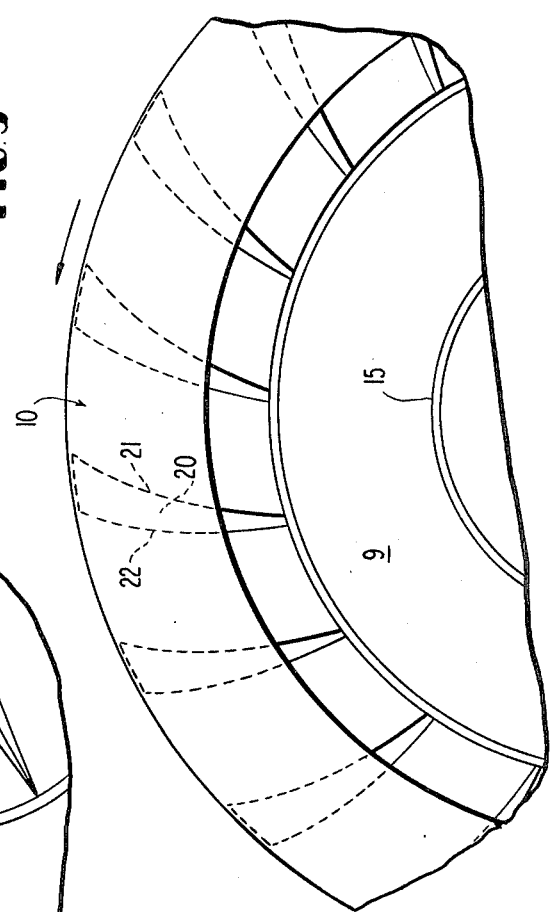

United States Patent [19]

Müller et al.

[11] 4,219,241
[45] Aug. 26, 1980

[54] VENTILATING ORNAMENTAL WHEEL COVER FOR SOLID WHEELS

[75] Inventors: Alf Müller, Waiblingen-Bittenfeld; Bernd Löper, Korb, both of Fed. Rep. of Germany

[73] Assignee: Daimler-Benz Aktiengesellschaft, Fed. Rep. of Germany

[21] Appl. No.: 952,047

[22] Filed: Oct. 17, 1978

[30] Foreign Application Priority Data

Nov. 11, 1977 [DE] Fed. Rep. of Germany ....... 2750424

[51] Int. Cl.$^2$ .......................... B60B 7/02; B60B 19/10
[52] U.S. Cl. ................................ 301/6 CS; 301/37 R; 188/264 W
[58] Field of Search .................. 301/6CS, 37 R, 37 P, 301/37 CM, 37 SS, 37 C, 37 CD, 37 TP, 37 PB; 188/264 W, 264 AA, 264 A

[56] References Cited
U.S. PATENT DOCUMENTS

| 2,746,805 | 5/1956 | Gamundi | 301/37 R |
|---|---|---|---|
| 2,761,530 | 9/1956 | Dawley | 188/264 W |
| 2,785,777 | 3/1957 | Horn | 301/6 CS X |
| 2,857,022 | 10/1958 | Lyon | 188/264 W |
| 2,870,879 | 1/1959 | Gaylord et al. | 301/6 CS X |
| 3,013,639 | 12/1961 | Lyon | 301/6 CS X |
| 3,059,730 | 10/1962 | Nickell et al. | 188/264 A X |
| 3,298,476 | 1/1967 | Day | 188/264 AA X |

Primary Examiner—Charles A. Marmor
Attorney, Agent, or Firm—Craig & Antonelli

[57] ABSTRACT

A wheel cover for solid wheels which include air suction openings provided in a wheel pan. The wheel cover includes a cover plate which terminates in a region of the wheel flange and defines with the wheel flange an annular air outlet opening. A plurality of more or less radially extending ventilator fins are disposed on a backside of the cover plate and the cover plate is provided in a radially inner zone of the ventilator fins with additional air suction openings. The ventilator fins are integrally formed with the cover plate and terminate radially outwardly about a periphery of the cover plate.

14 Claims, 5 Drawing Figures

U.S. Patent   Aug. 26, 1980   Sheet 1 of 2   4,219,241

FIG. 4
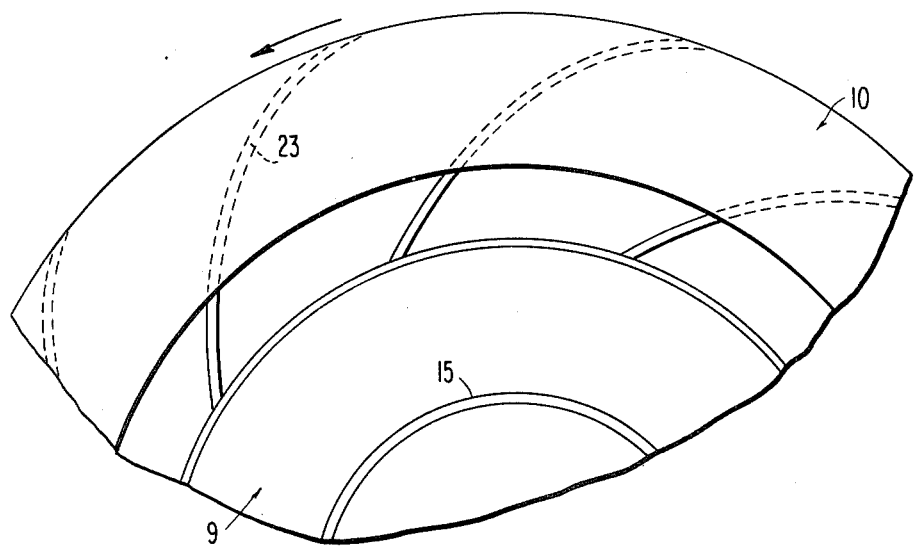
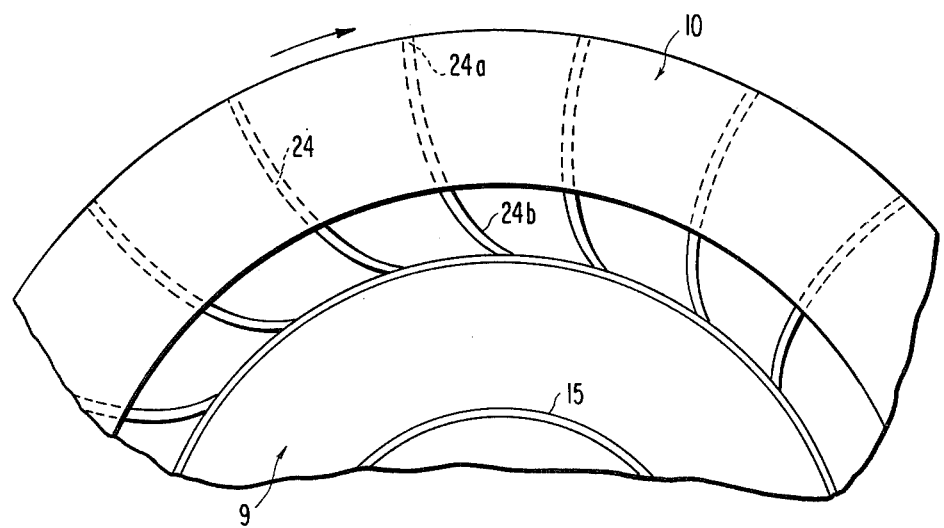
FIG. 5

VENTILATING ORNAMENTAL WHEEL COVER FOR SOLID WHEELS

The present invention relates to a cover arrangement and, more particularly, to an ornamental wheel cover for solid wheels which includes a cover plate terminating in a region of an outer flange of the wheel so as to radially and outwardly define an annular air gap as an air outlet opening against the wheel flange with the cover plate being provided with somewhat radially disposed ventilator fins in a radially outer region, on a side of the cover plate facing the wheel, which ventilator fins are cooperable with air suction openings provided in a wheel pan.

An ornamental wheel cover of the aforementioned type is disclosed in, for example, U.S. Pat. No. 2,689,770, wherein a cover plate is solid or closed with air being sucked-in by way of ventilator fins only through suction openings provided in the wheel pan. In this proposed construction, the air delivery attainable, insofar as it amounts to any meaningful quantity is comparably slight since the ventilator fins are bent out from a centering collar of the cover plate. By virtue of the bending of the ventilator fins, bent-in sections are produced resulting in the occurrence of closed sections of the centering collar. Additionally, the ventilator fins in the proposed construction, with respect to their axial length, have a relatively narrow radial width so that, in this respect, it would not be possible to attain a particularly great air delivery.

With a rather strong loading or continuous use of vehicle brakes as may occur, for example, in mountain driving or the like, a relatively large amount of heat is generated during the braking operation with such heat being particularly noticeable at, for example, a region of the wheel flange as well as in the ornamental wheel cover itself. This generation of large amounts of heat, over a period of time, may lead to a discoloration of the wheel cover as well as a "burning-in" of the brake dust into the wheel cover.

The aim underlying the present invention essentially resides in providing an ornamental wheel cover for vehicle wheels which attains the greatest possible cooling for vehicle brakes and which also attains an improved cooling of the heated wheel flange zone as well as the wheel cover itself.

In accordance with advantageous features of the present invention, the cover plate and the ventilator fins are integrally formed with additional air suction openings being provided at a radially inner zone of the ventilator fins which ventilator fins end or terminate radially outwardly about a periphery of the cover plate.

One advantage of the above-noted constructional features of the present invention resides in the fact that, by virtue of the disposition of the ventilator fins, it is possible to obtain a maximum radial length for the ventilator fins and hence a maximum air delivery. A further advantage of the present invention resides in the fact that, due to the provision of additional air-suction openings associated with the cover plate, cool air is sucked from the outside of the vehicle wheel so that there is a supplementary more or less radial flow of air which strikes the heated axially outer zone of the wheel flange. The supplemental flow of air then joins the heated flow of air brought in by the suction openings arranged in the wheel pan so that the cover plate is relieved of thermal stress and discolorations of the cover plate and a "burning-in" of dust particles are avoided.

In accordance with yet another feature of the present invention, the wheel cover may be constructed of a plastic material without the danger that use will result in the warping of the wheel cover since the cooling air, heated during a braking operation, is cooled down to such an extent by the partial flow from the additional air suction openings that any harmful effects on the wheel cover are avoided.

In accordance with still further features of the present invention, the cover plate may be divided into an outer plate part and an inner plate part with the respective parts being connected solely by way of the ventilator fins. Moreover, to provide for the least possible disturbance of the total air flow about the vehicle, the ventilator fins are advantageously somewhat set back with respect to a surface of the cover plate in the region of the air suction openings.

With an essentially flat cover plate, in accordance with yet other features of the present invention, the radially inner plate part is an almost flat or only very shallow arched plate with the arching of the radially inner part of the cover plate being opposed to the radially outward part of the cover plate. The inner plate part is arched against the associated solid wheel while the outer plate part is formed by a plate ring which runs radially inwardly against the wheel plate. An annular air gap, axially divided by the ventilator fins, if formed opposite a ring flange radially outwardly of the wheel cover so as to define an almost radial course.

Preferably, according to the present invention, a fastening ring is provided on the ventilator fins with the fastening ring also being integrally formed with the cover plate. The fastening ring may function as a supporting ring for tension springs which may be employed to fix the cover plate to the wheel.

In accordance with the present invention, the ventilator fins may be arranged on the cover plate so as to extend radially. Moreover, the ventilator fins may run against the normal direction of rotation of the wheel and be either inclined or curved from the inside outwardly. Additionally, with the ventilator fins running against the normal direction of rotation and curved from the inside outwardly, a supplemental twist may be provided in the respective fins. Also, the ventilator fins, at least in a radially inner zone, may extend in the normal direction of rotation and be curved from a position radially outwardly toward the inside.

Accordingly, it is an object of the present invention to provide a wheel cover which avoids by simple means shortcomings and disadvantages encountered in the prior art.

Another object of the present invention resides in providing a wheel cover by which it is possible to attain the greatest possible cooling for vehicle brakes.

A further object of the present invention resides in providing a wheel cover which minimizes if not avoids the occurrence of heat discoloration of the wheel cover.

Figure 1:
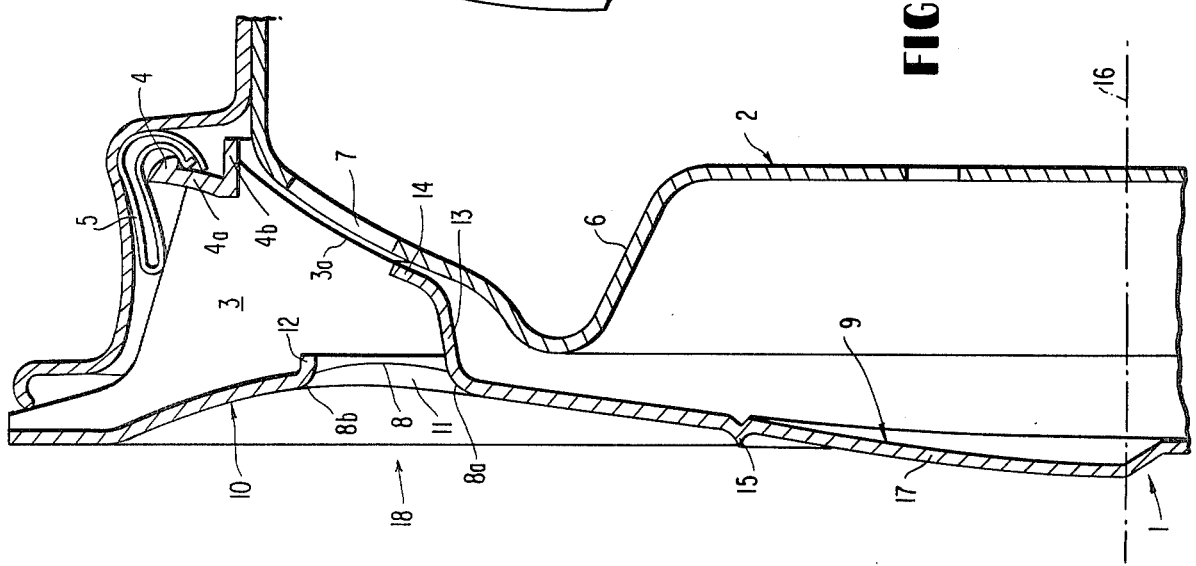

These and other objects, features, and advantages of the present invention will become more apparent from the following description when taken in connection with the accompanying drawings which show, for the purposes of illustration only, several embodiments in accordance with the present invention, and wherein:

FIG. 1 is a partial cross-sectional view of a wheel cover according to the present invention; and FIGS. 2–5 are plan views taken in the direction of arrow 18 in FIG. 1 illustrating alternative arrangements of ventilator fins in accordance with the present invention.

Referring now to the drawings wherein like reference numerals are used throughout the various views to designate like parts and, more particularly, to FIG. 1 in which only one-half of a wheel cover is illustrated since the wheel cover has an essentially rotation-symmetrical construction, according to this figure, a cover plate generally designated by the reference numeral 1 is provided with ventilator fins 3 being arranged on a back or rear side of the cover plate 1 facing a wheel generally designated by the reference numeral 2 which is only indicated in outline for the sake of clarity. The ventilator fins 3, axially shifted with respect to the cover plate 1 in a direction toward the wheel 2, are provided with a fastening ring 4 which permits the cover plate 1 to be fixed with respect to the wheel 2 by way of schematically illustrated tension springs 5.

The fastening ring 4 is constructed as an angular member and includes a radially outwardly extending portion or arm 4a which essentially supports the tension spring 5 and a portion or arm 4b which extends axially toward the wheel 2. The portion 4b of the fastening ring 4 extends essentially toward a wheel pan 6 so that the portion 4b may serve as a depth-abutting member and at the same time prevent an inflow of hot air into a region between the fastening ring 4 and the wheel 2. Additionally, the portion 4b of the fastening ring 4 functions as a strengthening element.

The cover plate 1, ventilator fins 3, and fastening ring 4 are integrally formed with one another and are made of a plastic material. The manufacturing of a wheel cover 1 from a plastic material of necessity involves a consideration of the temperature sensitivity of a chosen material unless, of course, particularly expensive types of plastics are to be utilized. With a wheel cover 1 which may be exposed to long-lasting braking processes such as occur, for example, in mountain driving of a vehicle, the temperature sensitivity of the plastic material utilized becomes of even more concern since the generation of heat during the braking process can pose a danger of warping to the wheel cover. This is especially true in vehicles having disk brakes which brakes are disposed in the wheel pan 6 since disk brakes develop considerable heat during a braking process which heat results in a heating of the wheel flange zone of the solid wheels.

To counteract the heat generated during, for example, a braking operation, according to the present invention, air is drawn or sucked in from a region behind the wheel pan 6 in which the vehicle brakes are disposed by way of ventilator fins 3 and air-suction openings 7 provided in the wheel pan 6 and associated with the ventilator fins 3. The ventilator fins 3 extend as close as possible to the wheel pan 6. The air suction openings 7, disposed in the wheel pan 6, are in more or less axial alignment with a bordering zone of the ventilator fins 3.

The ventilator fins 3 are each provided with an edge contour 3a facing the wheel pan 6. The edge contours 3a essentially correspond to a contour of the corresponding section of the wheel pan 6 at which the air suction openings 7 are provided. By virtue of the configuration and disposition of the ventilator fins 3, which extend to the periphery of the cover plate, it is possible for the respective ventilator fins 3 to have the greatest possible radial length so that a strong air flow is attainable. While such strong air flow is considerably effective in dissipating the heat generated during a braking operation, in certain circumstances, such cooling may not entirely eliminate all the disadvantages encountered in the prior art since an excessive thermal effect may occur during a braking operation causing the heated air to be carried along. Because of this excessive thermal effect, a danger for ornamental wheel covers results since the excessive heat may result in discolorations of the wheel cover 1 and a "burning-in" of dust and dirt particles on the wheel cover 1.

To counteract an excessive thermal effect, an air-suction opening in the form of an annular gap 8 is disposed in a radially inner zone of the ventilator fins 3 of the wheel cover in the area of the cover plate 1. Cooling air is drawn or sucked-in from outside of the wheel cover through the annular gap 8 with the suctioned air flow then being mixed with the heated air flow drawn-in by way of the suction openings 7 provided in the wheel pan 6. The additional air drawn-in by the annular gap impinges on a region of the outer wheel flange so that there is an intensified cooling of such region. This cooling by a supplemental flow of cooling air minimizes, if not avoids, the occurrence of discolorations of the wheel cover 1 and/or a "burning-in" of the dust and dirt particles on the wheel cover. Moreover, by virtue of this additional cooling by way of the annular gap 8, it is also possible to construct the wheel cover in one piece out of a plastic material without having to utilize very expensive heat-resistant plastics. This is particularly true with a fastening ring 4 having the configuration illustrated in FIG. 1 since such configuration also results in a reduction of the thermal load.

As shown in FIG. 1, the cover plate 1 is divided into a radially inner plate part generally designated by the reference numeral 9 and a radially outer plate part generally designated by the reference numeral 10. The radially inner and radially outer plate parts 9, 10 are arranged so as to define the annular gap 8 which forms the additional air suction openings associated with the wheel cover. The ventilator fins 3 function to join the radially inner and radially outer plate parts 9, 10 with the radially outer plate part constituting an annular surface.

Both the radially inner and radially outer plate parts 9, 10 are essentially planar so as to result in a wheel cover which has a substantially flat configuration. The radially inner and radially outer plate parts 9, 10 extend toward the annular gap 8 with a slight inward arch so that the annular gap 8 is arranged in a bottom of a depression which, in view of the rotation-symmetrical construction, forms an annular trough. The annular gap 8 is provided with bordering edges 8a, 8b which are preferably disposed in a radial plane so as to obtain a more favorable air coefficient.

The ventilator fins 3 extend over the entire radial width of the outer annular plate part 10 with a small drawn-in flange 12 being provided at a radially inward position of the annular plate part 10. The inner plate part 9 is provided with a flange 13 at a position opposite the flange 12. The flange 13 extends inwardly more or less axially to the essentially flat or planar surface of the cover plate and goes over or terminates in a radially extending annular cross-piece 14.

The cross piece 14 functions as a shield so that an axial flow-off of the air sucked-in through the suction openings 7 is prevented. For this purpose, preferably the annular gap 8 is axially shielded against the air suction openings 7 by the annular cross-piece 14 whereby, advantageously, the annular cross-piece 14 radially overlaps an essential part of the annular gap 8 and preferably extends to about the outer periphery or edge 8b of the annular gap 8.

As shown in FIG. 1, the ventilator fins 3 extend radially inwardly along the annular flange 12 to the cross-piece 14. After the cross-piece 14, the ventilator fins 3 are widened in a direction toward the wheel 2 so as to result in the ventilator fins having an essentially triangular basic configuration. The ventilator fins 3 support the fastening ring on an apex of the triangular configuration that is disposed oppositely of the cover plate 1. The tension springs 5 are arranged on the fastening ring 4 in such a manner that the springs 5 can bear radially on the ventilating fins 3 at a position between the fastening ring 4 and the cover plate 1. For this purpose, portions of the ventilating fins 3, which border the wheel flange, are slightly drawn radially inwardly from the outside toward the annular flange 12. The ventilator fins 3 extend radially outwardly at the periphery of the cover plate 1 and pass through a gap formed by the radially outer plate part 10 of the cover plate 1 and an outer portion of the wheel flange. In the region of the wheel flange, the radially outer plate part 10, constructed as an annular plate, extends substantially radially and is disposed substantially parallel to the outer portion of the wheel flange.

The radially inner plate part 9 indicated as having a shallow arcuate configuration, may bear an appropriate ornamental design and/or, for example, a raised, stamped company emblem which, in the illustrated example, is fashioned as one piece with the cover plate. In the illustrated embodiment, the emblem, not completely illustrated, includes radially extended arms staggered by 120° and arranged in a triangular configuration so as to form a stellate emblem. The emblem is disposed inside a circular ridge 15 toward the outside of the cover plate 1. To provide for a greater rigidity of the essentially flat, thin-walled cover plate 1, the ridge 15, in conjunction with embossings of arms 17 of the stellate emblem which arms become deeper toward the center axis 16, leads to a substantial reinforcing of the cover plate 1.

Additionally, in a manner not shown in detail in the drawings, the annular gap 8 may be made wider in a region between adjacent ventilator fins 3 so as to define an enlarged opening or valve port between the adjacent ventilator fins 3.

Figure 2:
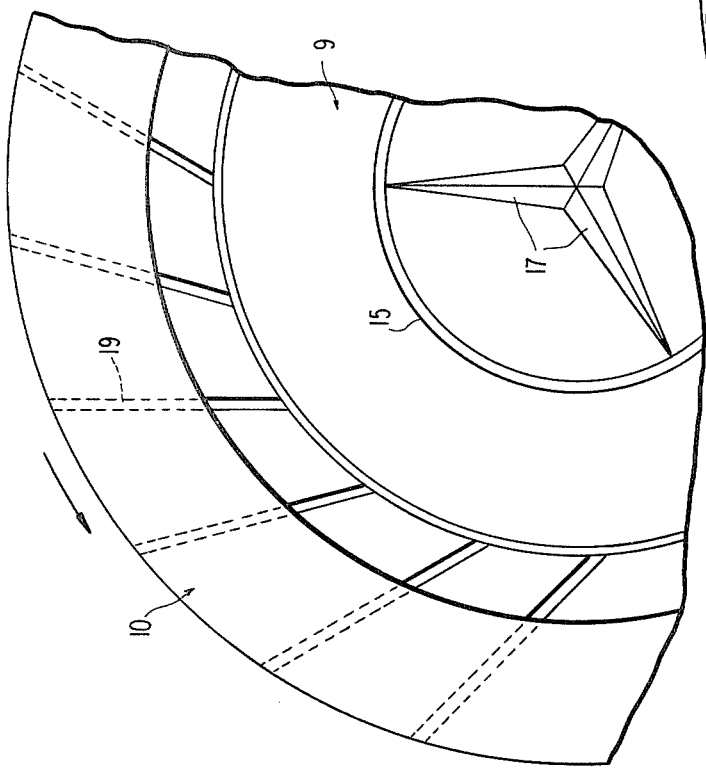

While the ventilator fins in FIG. 1 are disposed so as to extend radially, as shown in FIG. 2, the ventilator fins 19 may be provided which extend in a direction opposite the normal direction of rotation of a vehicle wheel with the fins 19 being disposed at an inclination from a radially inner position toward the radially outer position.

As shown in FIG. 3, ventilating fins 20 may be provided which are also inclined from a radially inner position to a radially outer position against the normal direction of rotation of the wheel. The ventilator fins 20 do not extend in a straight line as with the ventilator fins 19 but rather, they are disposed backward or rearwardly toward the radial and hence are curved against the normal direction of rotation of the wheel. Additionally, the ventilator fins 20 are twisted in such a way that with an almost axial course of the inner ends of the ventilator fins 20, at the outer ends of the ventilator fins 20, a blade edge 21 associated with the cover plate 1 extends toward the back, shifted, against the normal direction of rotation, as opposed to an edge 22 of the ventilator fin 20 which is turned away from the cover plate 1.

In FIG. 4, ventilator fins 23 are provided which are arranged so as to extend along a curved but not twisted path. The disposition or course of the ventilator fins 23, with reference to the normal direction of rotation of the vehicle wheel, thereby corresponds in principle to that of the ventilator fins of FIGS. 2 and 3. The ventilator fins 23, beginning at a radially inner position, extend against the normal direction or rotation of the vehicle wheel and are curved rearwardly with a radius of curvature of the ventilator fins 23 more or less corresponding to a radius of the cover plate 1.

As shown in FIG. 5, ventilator 24 may be provided which start, at least in a radially inner zone, in a curve extending in a normal direction of rotation of the vehicle wheel. The constructional arrangement of FIG. 5 is capable of attaining a stable flow relationship and is especially insensitive and allows the broadest tolerance range. In the illustration of FIG. 5, the ventilator fins 24 extend essentially radially in their radial outer zone 24a and are only set in the direction of rotation at the radially inner zone 24b. Preferably, the radially outer zone 24a is two or three times wider than the radially inner zone 24b.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such changes and modifications as are encompassed by the scope of the appended claims.

We claim:

1. A wheel cover for vehicle wheels having a wheel pan provided with air suction openings and a radially extending outer wheel flange, the wheel cover including a cover plate which terminates in an area of the wheel flange and which defines with the wheel flange an air outlet opening, and a plurality of ventilator fins disposed on a backside of the cover plate facing the vehicle wheel, characterized in that at least one additional air suction opening is provided in the cover plate at a radially inner zone of the ventilator fins, and in that radially outer ends of the ventilator fins terminate at an outer peripheral edge of the cover plate, said at least one additional air suction opening dividing the cover plate into a radially inner part and a radially outer part, said radially inner and outer parts being connected only by the ventilator fins.

2. A wheel cover according to claim 1, characterized in that the plurality of ventilator fins are integrally formed with the cover plate.

3. A wheel cover according to one of claims 1 or 2, characterized in that the cover plate is substantially planar.

4. A wheel cover according to claim 1, characterized in that a fastening ring means is provided on the ventilator fins for fastening the wheel cover to the vehicle wheel.

5. A wheel cover according to claim 4, characterized in that tension spring means are provided for fastening the wheel cover to the vehicle wheel, the tensioning spring means being supported by the fastening ring means.

6. A wheel cover according to claim 5, characterized in that each of the ventilator fins is provided with a bearing surface means disposed adjacent the fastening ring means for bearing against the tension spring means.

7. A wheel cover according to one of claims 4, 5, or 6, characterized in that the ventilator fins and the fastening ring means are integrally formed with the cover plate.

8. A wheel cover according to one of claims 1, 2, 4, or 6, characterized in that each of the ventilator fins extend radially outwardly along a backside of the cover plate.

9. A wheel cover according to one of claims 1, 2, 4, or 6, characterized in that each of the ventilator fins is inclined in a direction opposite a normal direction of rotation of the vehicle wheel.

10. A wheel cover according to one of claims 1, 2, 4, or 6, characterized in that each of the ventilator fins is curved in a direction opposite a normal direction of rotation of the vehicle wheel.

11. A wheel cover according to claim 10, characterized in that each of the ventilator fins is twisted so that a leading edge and a following edge of the respective ventilator fins are disposed in separate planes.

12. A wheel cover according to one of claims 1, 2, 4, or 6, characterized in that each of the ventilator fins is curved in a normal direction of rotation of the vehicle wheel at least in a radially inner zone of the cover plate from a position radially outwardly to a position radially inwardly of the cover plate.

13. A wheel cover for a disk wheel having a rim with with air intake openings provided in said rim, said wheel cover comprising a wheel disk which is one piece, flat and tapers in the area of said rim and which delimits a radial, annular air gap which functions as an air outlet opening with respect to said rim, and which is provided on its back side facing said rim with fan blades terminating in the area of the circumference of said cover, said blades being radially disposed and located in the area of said air intake openings in said wheel rim, characterized by the fact that said wheel disk comprises an annular air intake gap, said gap dividing said wheel cover into a radially outer disk part and a radially inner disk part, said outer and inner disk parts being connected exclusively by said fan blades which are integral with said wheel disk, said blades terminating radially inward at an annular boss associated with said inner disk part, said boss being axially spaced from said wheel disk and partially radially covering said annular slot.

14. A wheel cover for vehicle wheels having a wheel pan provided with air suction openings and a radially extending outer wheel flange, said wheel cover including a cover plate which terminates in an area of said wheel flange and which defines with said wheel flange an air outlet opening, and a plurality of ventilator fins disposed on a backside of said cover plate facing the vehicle wheel, characterized in that at least one additional air suction opening is provided in said cover plate at a radially inner zone of the ventilator fins, said at least one additional air suction opening dividing said cover plate into a radially inner part and a radially outer part, said radially inner and outer parts being connected exclusively by said ventilator fins.

* * * * *